(12) United States Patent
Hitchcock et al.

(10) Patent No.: US 10,257,135 B2
(45) Date of Patent: Apr. 9, 2019

(54) INTELLIGENT ELECTRONIC MAIL SERVER MANAGER, AND SYSTEM AND METHOD FOR COORDINATING OPERATION OF MULTIPLE ELECTRONIC MAIL SERVERS

(71) Applicant: Dynamic Network Services, Inc., Manchester, NH (US)

(72) Inventors: Jeremy Hitchcock, Manchester, NH (US); Thomas Daly, Nashua, NH (US); Charles Marshall, Sandown, NH (US); Matthew Horsfall, Penacook, NH (US)

(73) Assignee: Dynamic Network Services, Inc., Redwood Shores, CA (US)

( * ) Notice: Subject to any disclaimer, the term of this patent is extended or adjusted under 35 U.S.C. 154(b) by 0 days.

(21) Appl. No.: 15/378,132

(22) Filed: Dec. 14, 2016

(65) Prior Publication Data
US 2017/0126597 A1    May 4, 2017

Related U.S. Application Data

(63) Continuation of application No. 14/727,968, filed on Jun. 2, 2015, now Pat. No. 9,559,931, which is a continuation of application No. 12/502,679, filed on Jul. 14, 2009, now Pat. No. 9,070,115.

(60) Provisional application No. 61/080,543, filed on Jul. 14, 2008.

(51) Int. Cl.
*G06F 15/16* (2006.01)
*H04L 12/58* (2006.01)
*G06Q 10/10* (2012.01)
*H04L 12/26* (2006.01)
*H04L 29/08* (2006.01)

(52) U.S. Cl.
CPC ......... *H04L 51/046* (2013.01); *G06Q 10/107* (2013.01); *H04L 43/0888* (2013.01); *H04L 51/24* (2013.01); *H04L 67/10* (2013.01)

(58) Field of Classification Search
USPC ........................ 709/201, 202, 203, 204, 206
See application file for complete search history.

(56) References Cited

U.S. PATENT DOCUMENTS

| | | | |
|---|---|---|---|
| 6,334,143 | B2 | 12/2001 | Kowaguchi |
| 6,442,600 | B1 | 8/2002 | Anderson et al. |
| 7,020,779 | B1 | 3/2006 | Sutherland |
| 7,117,246 | B2 | 10/2006 | Christenson et al. |
| 7,865,554 | B2 | 1/2011 | Brubacher et al. |

(Continued)

*Primary Examiner* — Lan Dai T Truong
(74) *Attorney, Agent, or Firm* — Invoke

(57) ABSTRACT

Provided are an electronic mail server manager, and a system and method for coordinating operation of multiple electronic mail servers to efficiently store, process, and forward a high volume of electronic mail. The system for managing operation of multiple email servers in accordance with one embodiment may comprise an email message queue; a plurality of receiving email servers; a plurality of sending email servers; and an email server manager having a memory and a processor configured by the memory to perform the steps of storing received email messages in an email message queue; extracting destinations from the email messages; and delivering the email messages to the destinations by way of the sending email servers in correspondence to feedback received from the sending email servers and/or the destinations.

20 Claims, 4 Drawing Sheets

(56) References Cited

U.S. PATENT DOCUMENTS

| | | |
|---|---|---|
| 2002/0026484 A1 | 2/2002 | Smith et al. |
| 2002/0112008 A1 | 8/2002 | Christenson et al. |
| 2004/0136513 A1* | 7/2004 | Chiu .................... H04L 51/066 379/100.08 |
| 2004/0221011 A1 | 11/2004 | Kalash et al. |
| 2005/0086306 A1 | 4/2005 | Lemke et al. |
| 2005/0091323 A1 | 4/2005 | Smith et al. |
| 2005/0228867 A1 | 10/2005 | Osborne et al. |
| 2006/0086799 A1* | 4/2006 | Robertson ............... H04L 51/14 235/462.1 |
| 2006/0101124 A1* | 5/2006 | Landis ................. G06Q 10/107 709/206 |
| 2007/0130264 A1 | 12/2007 | Kristin et al. |
| 2009/0037539 A1* | 2/2009 | Postmus ................ H04L 51/14 709/206 |
| 2009/0265435 A1 | 10/2009 | Chen et al. |
| 2011/0302311 A1 | 12/2011 | Gross et al. |
| 2012/0011209 A1 | 1/2012 | Brubacher et al. |
| 2012/0228415 A1 | 9/2012 | Jagle et al. |
| 2012/0278415 A1 | 11/2012 | Walker |

\* cited by examiner

INTELLIGENT ELECTRONIC MAIL SERVER MANAGER, AND SYSTEM AND METHOD FOR COORDINATING OPERATION OF MULTIPLE ELECTRONIC MAIL SERVERS

CROSS-REFERENCE TO RELATED APPLICATIONS

This application is a continuation of a U.S. patent application "INTELLIGENT ELECTRONIC MAIL SERVER MANAGER, AND SYSTEM AND METHOD FOR COORDINATING OPERATION OF MULTIPLE ELECTRONIC MAIL SERVERS", having Ser. No. 14/727,968, filed Jun. 2, 2015, which is a continuation of U.S. patent application "INTELLIGENT ELECTRONIC MAIL SERVER MANAGER, AND SYSTEM AND METHOD FOR COORDINATING OPERATION OF MULTIPLE ELECTRONIC MAIL SERVERS", having Ser. No. 12/502,679, filed Jul. 14, 2009, now U.S. Pat. No. 9,070,115, which claims priority to U.S. Provisional Patent Application entitled "Intelligent Electronic Mail Server Manager, and System and Method for Coordinating Operation of Redundant or Distributed Electronic Mail Server Resources," having Ser. No. 61/080,543, filed Jul. 14, 2008, all of which are hereby incorporated herein in their entirety by reference.

FIELD OF INVENTION

The present invention is generally related to efficient storage, processing, and forwarding of high volume of electronic mail, and more particularly is related to a managed electronic mail server system capable of utilizing multiple electronic mail servers to send and receive electronic mail in coordinated fashion.

BACKGROUND OF INVENTION

Most electronic mail (hereinafter "email") systems employ only a single email server. For example, the computing resources available at only a single personal computer or other such machine (hereinafter "machine") might be utilized to provide electronic mail sending and receiving capabilities. Unfortunately, such a single-machine or single-server email system can easily get bogged down and become overloaded.

For example, an email system acting as relay between a source email server and a destination email server may contain a single machine that serves as receiving email server for receiving incoming email and that serves as sending email server for sending outgoing email, with little more than a "straight pipe" being present between the receiving email server and the sending email server specifically, the output of the receiving email server is essentially the input of the sending email server.

A somewhat more advanced email system may employ a machine dedicated for use as a receiving email server and another machine dedicated for use as a sending email server. Here again it is common for the two machines to be connected in straight-pipe fashion such that the output of the receiving email server is essentially the input of the sending email server.

In a more advanced email system, while arrays of multiple receiving email servers and/or multiple sending email servers may be employed to increase capacity, where output from the receiving email server array is more or less dumped directly into the input of the sending email server array, the full capacity of the system will often go unutilized. This is all the more true in light of the various inefficiencies that can result from random, disorganized, or haphazard attempts at delivering email messages to a wide variety of destination email servers. Furthermore, many of these destination email servers will likely be unavailable at any given time, which fact will only become known in many cases after much time has been spent waiting for a server to timeout. Moreover, this problem will be further compounded if repeated delivery attempts are made to the same unavailable destination email server, for example. Inefficiencies such as the foregoing may arise from inability to make coordinated use of distributed or redundant resources.

There is therefore an unaddressed need in the industry for an email system capable of efficient use of multiple machines and/or multiple servers to provide increased capacity and/or throughput in sending and/or receiving of email.

SUMMARY

One aspect of the present invention is an email server manager for managing operation of multiple email servers. The manager may contain a memory and a processor.

Other aspects of the present invention include a system and method for coordinating operation of multiple email servers to efficiently store, process, and forward a high volume of email messages.

One such system contains a memory, an email message queue, and a processor.

Another such system contains an email message queue, a plurality of sending email servers, and an email server manager, where the email server manager has a memory and a processor.

Yet another such system comprises an email message queue, a plurality of receiving email servers, a plurality of sending email servers, and an email server manager, where the email server manager has a memory and a processor.

The processor in any of the foregoing email server managers or systems may be configured by the memory to perform the steps of storing received email messages in an email message queue; extracting destinations from the email messages; and delivering the email messages to the destinations by way of a plurality of sending email servers in correspondence to feedback received from the sending email servers and/or the destinations.

Alternatively or in addition, the processor in any of the foregoing email server managers or systems may be configured by the memory to perform the steps of storing received email messages in an email message queue; extracting destinations from the email messages; and sending a first email message among the email messages in the queue as a first delivery attempt probe to a first destination among the destinations by way of a first sending email server among a plurality of sending email servers in accordance with a prescribed destination probe schedule.

At least a second sending email server, different from the first sending email server, may be prevented from sending the first email message or another email message having the first destination during the time that the first delivery attempt probe is being carried out. Alternatively or in addition, at least a second email message among the email messages in the queue, different from the first email message but having the first destination, may be prevented from being sent by the sending email servers during the time that the first delivery attempt probe is being carried out.

Furthermore, the processor in any of the foregoing email server managers or systems may be furthermore configured by the memory to perform the step of selectively delivering at least a third email message among the email messages in the queue, different from the first email message but having the first destination, to the first destination in the event that the delivery attempt probe is delivered successfully.

Moreover, the processor in any of the foregoing email server managers or systems may be furthermore configured by the memory to perform one or more of the following steps: filtering the received email messages prior to the storing of the received email messages in the email message queue; balancing the respective loads on the sending email servers; optimizing delivery of the email messages to reflect actual or anticipated email traffic; avoiding a collision with a busy sending email server among the sending email servers or a busy destination among the destinations; and working around a crashed sending email server among the sending email servers or a crashed destination among the destinations.

Another aspect of the present invention is a computer-readable medium having stored thereon computer-executable instructions for configuring a processor to perform any of various combinations of the steps recited above.

Still another aspect of the present invention is an email server management system for improving capacity, throughput, and efficiency of a plurality of email servers, the system containing front end handler means for handling received email messages; queue handler means for handling queuing of the received email messages; back end handler means for handling sending of the queued messages; and intelligent feature handler means for handling intelligent features for further improving capacity, throughput, and efficiency of the email servers.

Other embodiments, systems, methods, and features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Moreover, where more than one view is provided in the drawings, like reference numerals designate corresponding parts throughout the several views.

DETAILED DESCRIPTION

One aspect of the present invention is an electronic mail server manager including an intelligent electronic mail server manager. Other aspects of the present invention include a system and method for coordinating operation of multiple electronic mail servers (such as, redundant or distributed electronic mail servers) to efficiently store, process, and forward a high volume of electronic mail. Yet another aspect of the present invention is a managed electronic mail server system capable of utilizing multiple electronic mail servers to send and receive electronic mail in coordinated fashion.

Note that where the description below refers to a managed electronic mail server system for managing or coordinating operation of multiple electronic mail servers in accordance with one aspect of the present invention, this description should be understood to apply as well to an electronic mail server manager and to a method for coordinating operation of multiple electronic mail servers in accordance with other aspects of the present invention with modification as appropriate. The present system may be provided by a Web-based application. The following description assumes that the present system is provided by a Web-based application. It should be noted that the system may also be provided in an environment that is not Web-based.

The electronic mail server management system of the invention can be implemented in software (such as, firmware), hardware, or a combination thereof. In the currently contemplated best mode, the electronic mail server management system is implemented in software, as an executable program, and is executed by a special or general purpose digital computer, such as a personal computer (PC; IBM-compatible, Apple-compatible, or otherwise), workstation, minicomputer, or mainframe computer. Specifically, the electronic mail server management system, as provided by the computer, may be accessible via a Web site, through which parties using the electronic mail server management system may interact. Further description of the electronic mail server management system, and interaction therewith is provided below.

Figure 1:
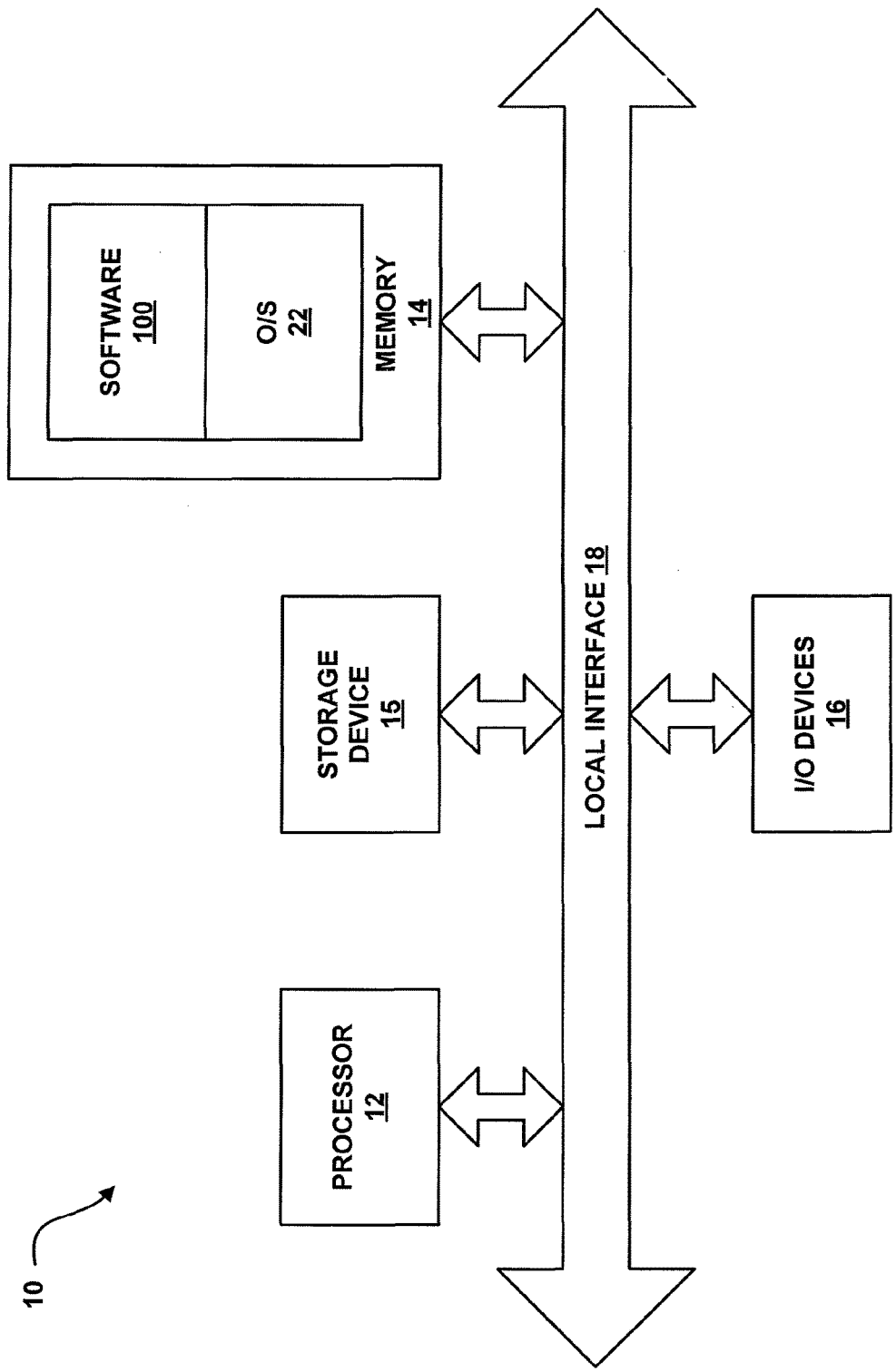
FIG. 1 is a schematic diagram showing an example of a general purpose computer and associated software for implementing a system and method for coordinating operation of multiple electronic mail servers in accordance with one aspect of the present invention.

An example of a general purpose computer that can implement the electronic mail server management system of the present invention is shown in FIG. 1. In FIG. 1, the electronic mail server management system is denoted by reference numeral 10. It should be noted that communication with the electronic mail server management system may be provided by multiple means such as, but not limited to, the Internet. Further description with regard to use of the electronic mail server management system via use of the Internet is provided below.

Generally, in terms of hardware architecture, as shown in FIG. 1, the computer 10 includes a processor 12, memory 14, storage device 15, and one or more input and/or output (I/O) devices 16 (or peripherals) that are communicatively coupled via a local interface 18. The local interface 18 can be, for example but not limited to, one or more buses or other wired or wireless connections, as is known in the art. The local interface 18 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 12 is a hardware device for executing software, particularly that stored in the memory 14. The processor 12 can be any custom made or commercially available processor, a central processing unit (CPU), an auxiliary processor among several processors associated with the computer 10, a semiconductor based microprocessor (in the form of a microchip or chip set), a macroprocessor, or generally any device for executing software instructions.

The memory 14 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 14 may incorporate electronic, magnetic, optical, and/or other types of storage media. Note that the memory 14 can have a distributed architecture, where various components are situated remote from one another, but can be accessed by the processor 12.

The software 100 in memory 14 may include one or more separate programs, each of which comprises an ordered listing of executable instructions for implementing logical functions of the electronic mail server management system, as described below. In the example of FIG. 1, the software 100 in the memory 14 defines the electronic mail server management system functionality in accordance with the present invention. In addition, the memory 14 may contain an operating system (O/S) 22. The operating system 22 essentially controls the execution of computer programs and provides scheduling, input-output control, file and data management, memory management, and communication control and related services.

Instructions for implementing the electronic mail server management system 10 may be provided by a source program, executable program (object code), script, or any other entity containing a set of instructions to be performed. When a source program, then the program needs to be translated via a compiler, assembler, interpreter, or the like, which may or may not be to included within the memory 14, so as to operate properly in connection with the O/S 22. Furthermore, instructions for implementing the electronic mail server management system 10 can be written as (a) an object oriented programming language, which has classes of data and methods, or (b) a procedure programming language, which has routines, subroutines, and/or functions.

The I/O devices 16 may include input devices, for example but not limited to, a keyboard, mouse, scanner, microphone, etc. Furthermore, the I/O devices 16 may also include output devices, for example but not limited to, a printer, display, etc. Finally, the I/O devices 16 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the electronic mail server management system 10 is in operation, the processor 12 is configured to execute the software 100 stored within the memory 14, to communicate data to and from the memory 14, and to generally control operations of the computer 10 pursuant to the software 100. The electronic mail server management system 10 and the O/S 22, in whole or in part, but typically the latter, are read by the processor 12, perhaps buffered within the processor 12, and then executed.

When the electronic mail server management system 10 is implemented in software, as is shown in FIG. 1, it should be noted that instructions for implementing the electronic mail server management system 10 can be stored on any computer-readable medium for use by or in connection with any computer-related system or method. Such a computer-readable medium may, in some embodiments, correspond to either or both the memory 14 or the storage device 15 shown in FIG. 1. In the context of this document, a computer-readable medium is an electronic, magnetic, optical, or other physical device or means that can contain or store a computer program for use by or in connection with a computer-related system or method. Instructions for implementing the electronic mail server management system 10 can be embodied in any computer-readable medium for use by or in connection with the processor 12 or other such instruction execution system, apparatus, or device. Although the processor 12 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor 12 or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the electronic mail server management system 10 is implemented in hardware, the electronic mail server management system 10 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
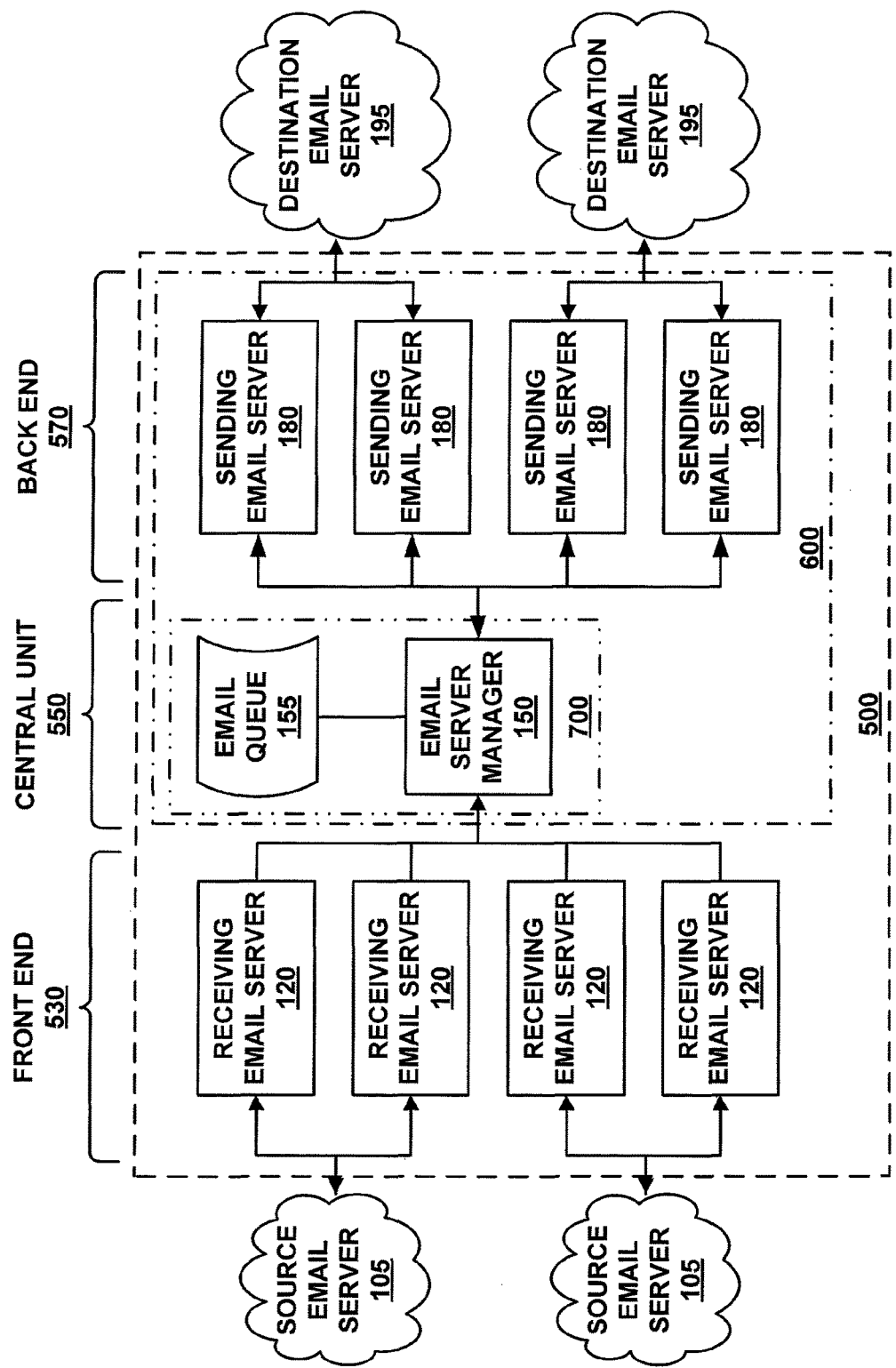
FIG. 2 is a block diagram showing a managed email server system, in accordance with a first exemplary embodiment of the present invention.

Referring to FIG. 2, this is a block diagram showing a managed electronic mail (hereinafter "email") server system 10 in accordance with a first exemplary embodiment of the present invention.

At FIG. 2, three representative systems 500, 600, 700 of varying levels of complexity are indicated by respectively enclosing these within a dashed line, a single-dot chain line, and a double-dot chain line. More specifically, front-central-back system 500 enclosed within a dashed line at FIG. 2 contains a front end 530, a central unit 550, and a back end 570. Furthermore, central-back system 600 enclosed within a single-dot chain line at FIG. 2 contains a central unit 550 and a back end 570. Moreover, central system 700 enclosed within a double-dot chain line at FIG. 2 contains a central unit 550. These three systems 500, 600, 700 are respectively examples of the managed email server system 10 shown in FIG. 1.

As the central-back system 600 and the central system 700 are respective subsets of the front-central-back system 500, description below is given with respect to the front-central-back system 500. One of ordinary skill in the art will readily understand the composition and operation of the central-back system 600 and the central system 700 from the description below of the front-central-back system 500.

In the front-central-back system 500 shown at FIG. 2, the front end 530 contains a receiving email server array containing one or more receiving email servers 120. Furthermore, the central unit 550 contains an email server manager 150 and associated email message queue 155. Moreover, the back end 570 contains a sending email server array containing one or more sending email servers 180.

Also shown at FIG. 2 are one or more source email servers 105 and one or more destination email servers 195, these being respectively shown within cloud-like outlines to indicate that connection thereto is typically carried out by way of the Internet or other such network. In a typical application of the present invention, the components of the front-central-back system 500 shown within the dashed line at FIG. 2 might be local, and the components outside the dashed line at FIG. 2 might be remote, an email message accepted from a first remote location serving as source being handled by the email server manager 150 and other local components before being delivered to a second remote location serving as destination.

The receiving email servers 120 are connected so as to be capable of accepting email messages from the source email servers 105, and are connected so as to be capable of delivering email messages to the email server manager 150.

The sending email servers 180 are connected so as to be capable of accepting email messages from the email server manager 150, and are connected so as to be capable of delivering email messages to the destination email servers 195. Furthermore, the sending email servers 180 are capable of providing feedback to the email server manager 150 indicating whether an attempt to deliver an email message to a destination email server 195 was successful. Each of the sending email servers 180 is also capable of informing the email server manager 150 as to whether it is available or busy, and may in some embodiments provide further information such as backlog or available capacity useful for load balancing or other functions carried out by the email server manager 150.

The email server manager 150 is connected so as to be capable of accepting email messages from the receiving email servers 120, and is connected so as to be capable of delivering email messages to the sending email servers 180. Furthermore, the email server manager 150 is capable of receiving feedback from the sending email servers 180 indicating whether an attempt to deliver an email message to a destination email server 195 was successful, and is furthermore capable of receiving information sent from each of the sending email servers 180 indicating whether the sending email server 180 is available or busy as well as any other information such as backlog or available capacity that the sending email server 180 may provide to the email server manager 150.

The email server manager 150 has access to a storage area acting as an email message queue 155 capable of storing email messages accepted from the receiving email servers 120 at least until those email messages have been delivered to the sending email servers 180. The email message queue 155 may be in the same location as, or may be in a different location from, the circuitry and/or software used to implement the email server manager 150. The email server manager 150 is capable of queuing email messages in the email message queue 155, and of delivering email messages to the sending email servers 180, in accordance with programmed instructions. Moreover, the email server manager 150 is capable of storing and executing instructions for implementing various functionalities, described below. For example, in addition to the capabilities described above, the email server manager 150 may have filtering, scheduling, destination probing, email message grouping, queue locking, available destination preferential treatment, load balancing, and other functionalities as described in further detail below.

Presence of the email message queue 155 makes it possible for the email server manager 150 to deliver an email message from the email message queue 155 to the sending email servers 180 at a time of its choice. In delivering an email message from the email message queue 155 to the sending email servers 180, the email server manager 150 moreover has the ability to route the email message to the sending email server 180 of its choice.

In this way, the email server manager 150 may route email messages from a single email message queue 155 to a plurality of sending email servers 180 so as to efficiently deliver email messages to destination email servers 195.

Figure 3:
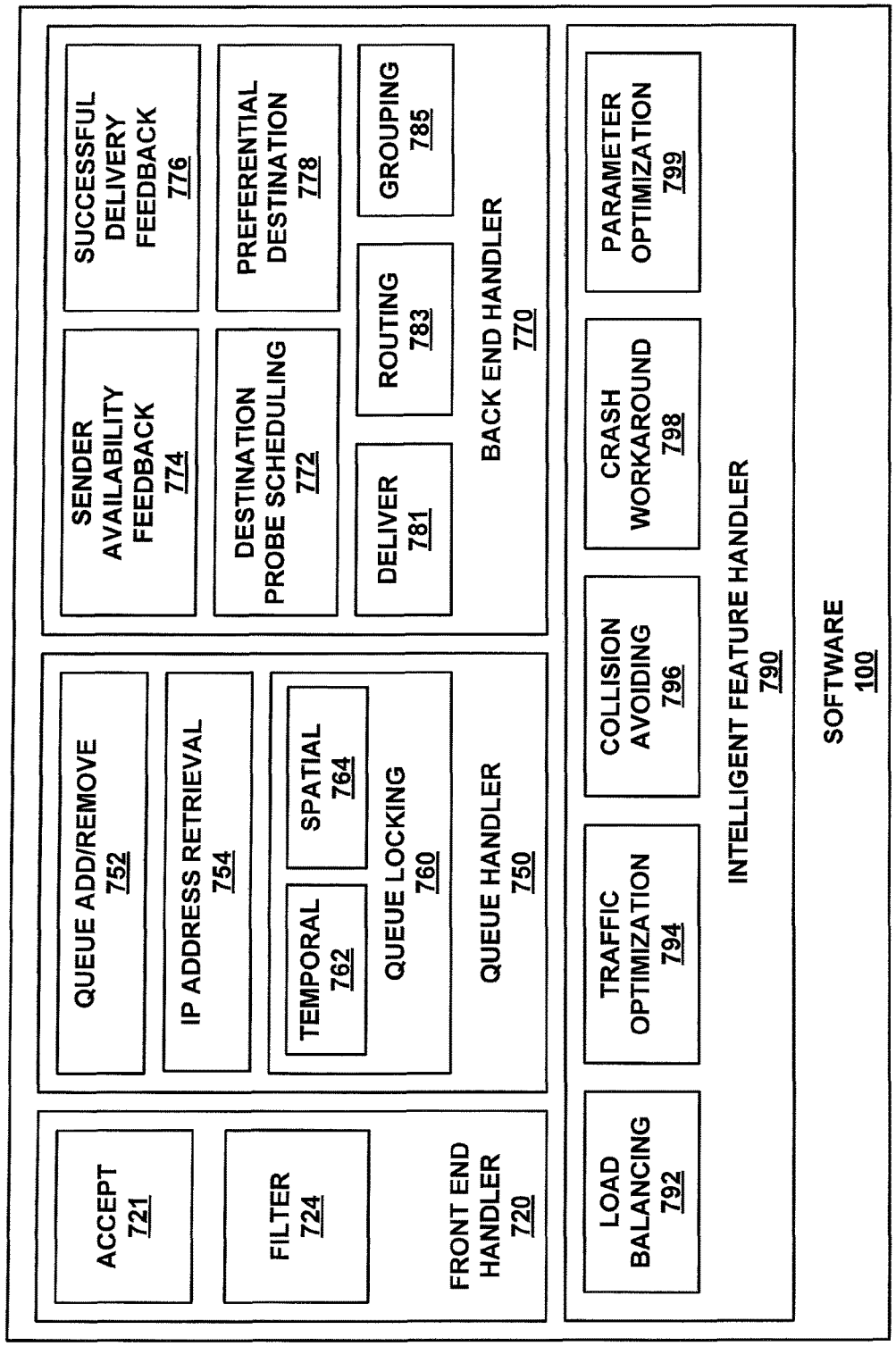
FIG. 3 is a block diagram showing functional blocks representing functionality defined by the software at FIG. 1 in accordance with the first embodiment.

FIG. 3 is a block diagram showing functional blocks representing functionality defined by the software 100 at FIG. 1 in accordance with the first embodiment. As mentioned above, the managed email system 10 may, in accordance with various aspects of the present invention, be implemented as a front-central-back system 500, a central-back system 600, or a central system 700. Description below of the software 100 with reference to FIG. 3 is given in the context of an embodiment in which the present invention is implemented as a central system 700. As the central system 700 shown at FIG. 2 contains an email server manager 150 and associated storage for use as an email message queue 155, it should be understood that the various functionalities of the software 100 described below with reference to FIG. 3 are carried out by the email server manager 150 shown in FIG. 2. One of ordinary skill in the art will readily understand how to apply the description below to operation of the software 100 in the context of embodiments in which the present invention is implemented as a front-central-back system 500 or as a central-back system 600.

Referring to FIG. 3, the software 100 in the present embodiment includes a front end handler 720, a queue handler 750, a back end handler 770, and an intelligent feature handler 790.

The front end handler 720 includes an email accepting module 721 and an email filtering module 724. The email accepting module 721 is capable of accepting email messages from the receiving email servers 120. The email filtering module 724 is capable of applying a spam filter or other such rule-based algorithm to determine whether to approve or reject email messages accepted by the email accepting module 721. Functionality of these modules is described in further detail below.

The queue handler 750 includes a queue add/remove module 752, an IP address retrieval module 754, and a queue locking module 760. Furthermore, the queue locking module 760 includes a temporal queue locking module 762 and a spatial queue locking module 764. Functionality of these modules is described in further detail below.

The back end handler 770 includes an email delivering module 781, a routing module 783, a grouping module 785, a destination probe scheduling module 772, a sender availability report feedback module 774, a successful delivery feedback module 776, and a preferential destination module 778. The email delivering module 781 is capable of delivering email messages from the email message queue 155 to the sending email servers 180. Functionality of these modules is described in further detail below.

The intelligent feature handler 790 includes a load balancing module 792, a traffic optimization module 794, a collision avoiding module 796, a crash workaround module 798, and a parameter optimization module 799. Functionality of these modules is described in further detail below.

Figure 4:
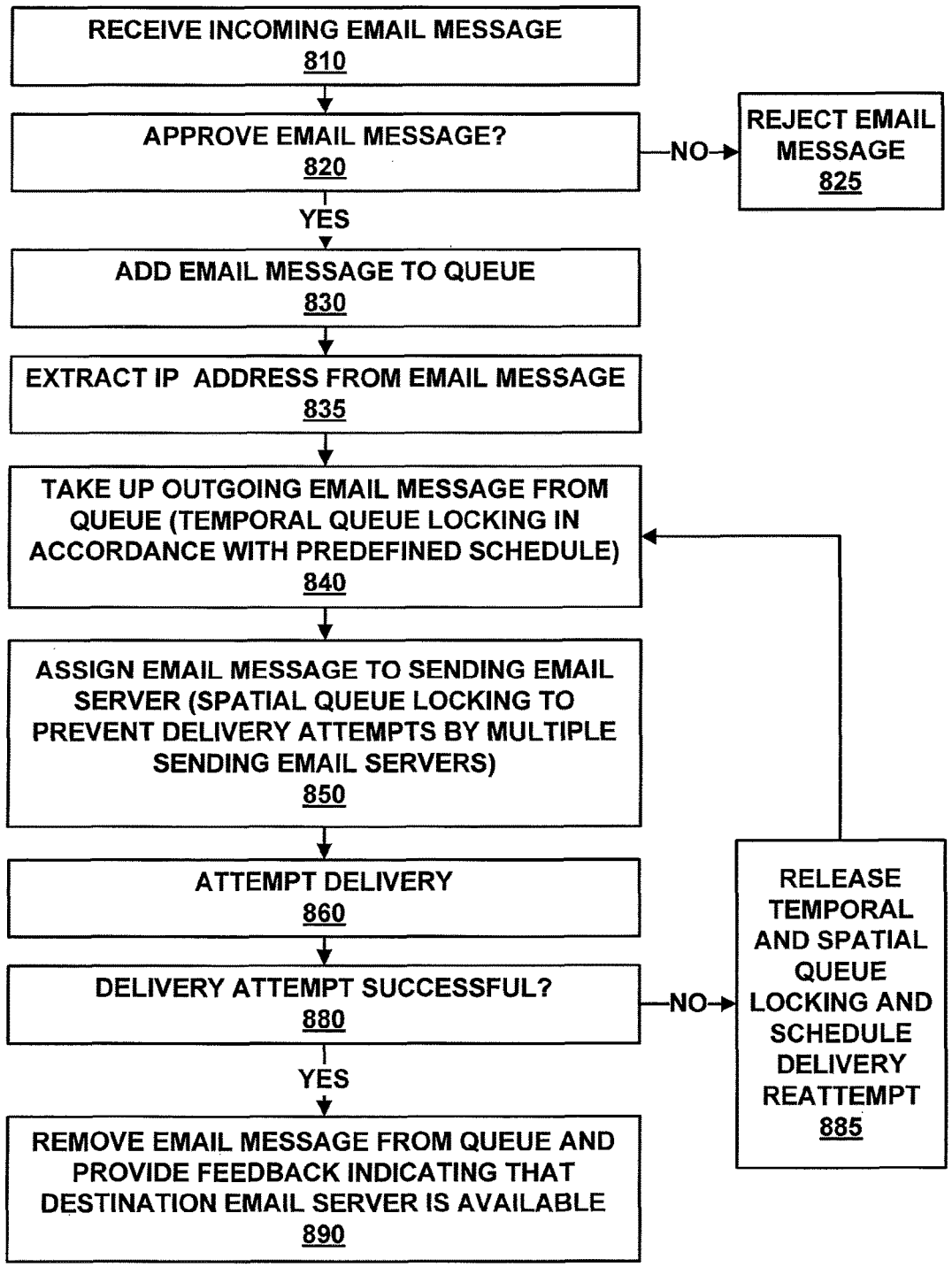
FIG. 4 is a flowchart showing an example of processing carried out by an email server manager in the managed email server system shown in FIG. 2.

Referring to FIG. 4, this is a flowchart showing an example of processing carried out in the context of the managed email system 500, 600, 700 shown in FIG. 2 under control of software 100 described with reference to FIG. 3 by way of example taking the case of the central system 700. For purposes of the description given below with reference to FIG. 3, it should be understood that the functionality of the software 100 shown in FIG. 3 is implemented by the email server manager 150.

As shown by block 810 in the flowchart of FIG. 4, an incoming email message from a source email server 105 at a remote location on the Internet or other such network is received at a receiving email server 120, and the incoming email message is thereafter accepted (but not yet approved) by the front end handler 720 of the email server manager 150.

As shown by block 820 in the flowchart of FIG. 4, the email filtering module 724 of the email server manager 150 applies a spam filter or other such rule-based algorithm to determine whether to approve the incoming email message accepted from the receiving email server 120. If the email message is determined at block 820 to be spam, processing proceeds to block 825, where the email message is rejected and is not processed further. If the email message is approved at block 820, processing proceeds to block 830, where the queue add/remove module 752 of the email server manager 150 causes the email message to be added to the email message queue 155. By carrying out such filtering before queuing the email message, it is possible for the email server manager 150 to improve capacity, throughput, and efficiency.

In accordance with the email message queuing functionality of the queue add/remove module 752, the email server manager 150 causes an incoming email message received from a source email server 105 by way of a receiving email server 120 to be stored in the email message queue 155 while it awaits transmission to a destination email server 195 by way of a sending email server 180. By thus storing incoming email messages in the email message queue 155, the email message queue 155 is made to act as buffer, allowing the email server manager 150 to carry out grouping, routing, probing, scheduling, and/or other operations described below to improve capacity, throughput, and efficiency. That is, in contrast to the situation in which email messages are simply relayed in the order in which they are received from source email servers 105 to destination email servers 195, presence of storage in the form of the email message queue 155 and presence of logic in the form of the email server manager 150 makes it possible to add intelligence in the form of various functionalities permitting improvement in capacity, throughput, and efficiency.

Each email message stored at the email message queue 155 is bound for one or more destinations. The destination email server 195, typically present at a remote location on the Internet or other such network, may be known, for example, by reviewing the email message. For example, the email message may contain a header indicating the Internet Protocol address (hereinafter "IP address") of the destination email server 195. By knowing the destination IP addresses of the email messages stored in the email message queue 155, and by associating email messages with those destination IP addresses and/or grouping email messages according to destination IP address, it is possible for the email server manager 150 to improve capacity, throughput, and efficiency, as described in further detail below. As shown by block 835 in the flowchart of FIG. 4, the IP address retrieval module 754 of the email server manager 150 extracts the destination IP address of the email message added to the email message queue 155 by the queue add/remove module 752.

As shown by block 840 in the flowchart of FIG. 4, the temporal queue locking module 762 of the email server manager 150 carries out temporal queue locking by way of the destination probe scheduling module 772 with optional assistance from the grouping module 785. That is, in accordance with temporal queue locking functionality, the destination probe scheduling module 772 of the email server manager 150 causes destinations of email messages stored within the email message queue 155, as determined by extraction by the IP address retrieval module 754, to be probed in accordance with a predefined schedule (e.g., every 2 minutes). Because each email message stored in the email message queue 155 is associated with at least one IP address or other suitable identifier of a destination email server 195, it is possible for the destination probe scheduling module 772 of the email server manager 150 to compile a destination probe schedule by listing all destinations of all email messages stored in the email message queue 155 and by scheduling a time at which each destination should be probed. Probing here refers to an attempt to deliver an email message to a particular destination.

At this time, in the event that there are multiple email messages bound for the same destination, redundancy is preferably eliminated by the grouping module 785 of the email server manager 150, which in one embodiment is capable of causing such a redundant destination to be included only once in the probing schedule compiled by the destination probe scheduling module 772. Thus, the destination probe scheduling module 772 in combination with the grouping module 785 is capable of carrying out processing such that, for each destination IP address of each email message stored within the email message queue 155, the email server manager 150 causes a sending email server 180 (not necessarily the same sending email server 180 each time) to probe the destination IP address every two minutes, for example, until the destination email server 195 is found to be available to receive email.

By thus grouping email messages according to destination and compiling a schedule for probing each destination in turn, it is possible to provide what is referred to herein as temporal queue locking, whereby a particular destination is probed only once every scheduled interval. That is, a destination is said to be temporally locked at times when probing of that destination is not scheduled, and any email messages bound for a particular destination are similarly said to be temporally locked at times when probing of that destination is not scheduled, except that where an email message has multiple destinations a copy of that email message may be delivered to unlocked destination(s) while a copy of that email message is retained for delivery to locked destination(s). By thus reducing redundancy and making delivery attempts in accordance with a schedule, it is possible to improve capacity, throughput, and efficiency.

As shown by block 850 in the flowchart of FIG. 4, the spatial queue locking module 764 of the email server manager 150 carries out spatial queue locking by way of the destination probe scheduling module 772 in combination with the routing module 783 with optional assistance from the grouping module 785. That is, where there are multiple sending email servers 180, it is also possible to provide what is referred to herein spatial queue locking, whereby probing of a particular destination is assigned to only one sending email server 180 at a time. For example, during a delivery attempt scheduled by the destination probe scheduling module 772 in accordance with the temporal queue locking functionality of the temporal queue locking module 762 as described above, when the email server manager 150 is causing a sending email server 180 to probe an IP address of a destination email server 195 listed in the header of an email message stored within the email message queue 155, the spatial queue locking module 764 of the email server manager 150 may use this spatial queue locking functionality to lock out the destination IP address so as to prevent other sending email servers 180 from attempting delivery to the same IP address. At this time, all other email messages in the email message queue 155 bound for that same destination IP address may similarly be locked out by the grouping module 785 of the email server manager 150, which in one embodiment is capable of preventing any of the sending email servers 180 from attempting delivery of those other email messages that are bound for that same destination IP address until it can be determined that the delivery attempt probe was successful.

That is, where spatial queue locking functionality is employed to lock out IP addresses and the email messages associated therewith, probing of destination email servers 195 may be carried out such that when one sending email server 180 is probing the IP address of a particular destination email server 195 to see whether that destination email server 195 is available to receive email, other sending email servers 180 are prevented from probing that same IP address. In other words, a destination is said to be spatially locked at times when probing of that destination is assigned to one and only one sending email server 180, and any email messages bound for a particular destination are similarly said to be spatially locked at times when probing of that destination is assigned to one and only one sending email server 180, except that where an email message has multiple destinations a copy of that email message may be delivered to unlocked destination(s) while a copy of that email message is retained for delivery to locked destination(s). By thus preventing probing of the same destination email server 195 by multiple sending email servers 180, it is possible to reduce redundancy in the use of sending email servers 180 and improve capacity, throughput, and efficiency.

In one embodiment where there are multiple sending email servers 180, selection of which sending email server 180 to use for the delivery attempt probe may be facilitated by sender availability reporting functionality provided at the sending email servers 180. In such an embodiment, the email server manager 150 will preferably have a sender availability report feedback module 774 allowing it to take advantage of the sender availability reporting functionality at the sending email servers 180. In such an embodiment, when a sending email server 180 becomes available to deliver email messages, this fact is communicated to the email server manager 150. After receiving communication to the effect that a sending email server 180 is available to deliver email messages, an email message taken up from the email message queue 155 for a delivery attempt probe in accordance with a predefined IP address probing schedule as mentioned above would be assigned by the email server manager 150 to the available sending email server 180, at which time the destination IP address and all email messages associated therewith would moreover preferably be locked out in accordance with queue locking functionality as described above.

As shown by block 860 in the flowchart of FIG. 4, the email delivering module 781 of the email server manager 150 causes the sending email server 180 to which the email message has been assigned to attempt to deliver the email message to the destination email server 195 at, for example, the IP address listed in the header of the email message. As mentioned above, this delivery attempt also serves as a probe to see whether the destination email server 195 is available to accept email.

As shown by block 880 in the flowchart of FIG. 4, the successful delivery feedback module 776 of the email server manager 150 determines whether the delivery attempt probe scheduled by the destination probe scheduling module 772 was successful.

In the event that the successful delivery feedback module 776 determines at block 880 that the delivery attempt probe was unsuccessful, meaning, for example, that the destination email server 195 is not accepting email, the receiving queue thereof is closed, the delivery attempt results in an error, or the delivery attempt results in a timeout with no receipt of delivery confirmation having been received, the email server manager 150 preferably releases any lock that had been placed on the destination IP address and/or any email messages associated therewith in accordance with queue locking functionality mentioned above, and schedules the destination address for a delivery reattempt in accordance with the predefined schedule mentioned above.

That is, if as a result of the delivery attempt probe it is found at block 880 that delivery to the destination email server 195 was unsuccessful, processing proceeds to block 885, where the temporal and spatial locks initiated by the temporal queue locking module 762 and the spatial queue locking module 764 for that email message and sending email server 180, and any email messages similarly locked out by the grouping module 785 as well as any sending email servers 180 similarly locked out by the routing module 783, are released. Following release of the temporal and spatial locks at block 885, the destination probe scheduling module 772 schedules a delivery reattempt for that email message, and processing returns to block 840.

In the event that the successful delivery feedback module 776 determines at block 880 that the delivery attempt probe was successful, processing proceeds to block 890, where the queue add/remove module 752 causes the successfully delivered email message to be removed from the email message queue 155.

Furthermore, if as a result of the delivery attempt probe it is found that delivery to the destination email server 195 was successful, meaning, for example, that the destination email server 195 is accepting email and the receiving queue thereof is moreover open, this fact is preferably reported from the sending email server 180 to the email server manager 150 in accordance with successful delivery reporting functionality. Such reporting of successful delivery from the sending email server 180 to the email server manager 150 may be facilitated by successful delivery reporting functionality provided at the sending email servers 180. In such an embodiment, the email server manager 150 will preferably have a successful delivery feedback module 776 allowing it to take advantage of the successful delivery reporting functionality at the sending email servers 180. In such an embodiment, when the email server manager 150 receives feedback from a sending email server 180 to the effect that delivery of the email message was successful, since the destination email server 195 to which the email message was successfully sent is now known to be available for receiving email, the preferential destination module 778 of the email server manager 150 preferably causes other email messages bound for the same IP address to be transmitted to that destination email server 195 by way of the same sending email server 180 or by way of another sending email server 180 or by way of any suitable subset of the sending email servers 180. That is, the preferential destination module 778 preferably overrides any scheduling or queue locking that may currently be in force, and instead preferentially delivers other (preferably all) email messages bound for the destination to which the email message was successfully delivered. By thus providing feedback from the sending email servers 180 to the email server manager 150 so as to alert the email server manager 150 when an email message delivery attempt has been successful, and by promptly thereafter moving to the top of the queue or otherwise preferentially taking up for delivery other (preferably all) email messages bound for that same destination to which an email message delivery probe is known to have resulted in successful delivery, it is possible to improve capacity, throughput, and efficiency. Especially when there is a large volume of email messages bound for a destination email server 195 that is frequently unavailable, simultaneous, parallel, or ganged use of multiple sending email servers 180 to deliver email messages bound for the destination email server 195 when it is known to have become available to receive email will permit significant improvement in capacity, throughput, and efficiency.

In some embodiments, the intelligent feature handler 790 of the email server manager 150 may provide load balancing and other functionalities permitting efficient use of available resources.

For example, a parameter optimization module 799 provided at the email server manager 150 in some embodiments may intelligently vary one or more parameters within the control of the email server manager 150 that may affect capacity, throughput, or efficiency. Such parameters include the interval between scheduled delivery attempts, the number of sending email servers 180 probing destination email servers 195 (or the fraction of time that any one or more of the sending email servers 180 spends probing destination email servers 195), and the number of sending email servers 180 delivering email messages to destination email servers 195 found to be available to accept email messages as a result of a successful delivery attempt probe (or the fraction of time that any one or more of the sending email servers 180 spends delivering email messages to destination email servers 195 found to be available to accept email messages as a result of a successful delivery attempt probe).

For example, the delivery reattempt interval can be made variable such that it is set to a larger number (less-frequent probing of destination email servers 195) when sending email servers 180 are operating near their full capacity, and such that it is set to a lower number (more-frequent probing of destination email servers 195) when sending email servers 180 are operating well below their full capacity, in an effort to keep the sending email servers 180 that are available to deliver email messages supplied with a steady stream of email messages bound for destination email servers 195 known to be available to accept email.

Similarly, although where spatial queue locking is employed there will be only one sending email server 180 probing any particular destination email server 195 at any given time, the number of sending email servers 180 probing destination email servers 195 (or the fraction of time that any one or more of the sending email servers 180 spends probing destination email servers 195) can be varied in an effort to keep the sending email servers 180 that are available to deliver email messages supplied with a steady stream of email messages bound for destination email servers 195 known to be available to accept email.

Likewise, the number of sending email servers 180 delivering email messages to destination email servers 195 found to be available to accept email messages as a result of a successful delivery attempt probe (or the fraction of time that any one or more of the sending email servers 180 spends delivering email messages to destination email servers 195 found to be available to accept email messages as a result of a successful delivery attempt probe) can be varied in an effort to keep the sending email servers 180 that are available to deliver email messages supplied with a steady stream of email messages bound for destination email servers 195 known to be available to accept email.

In particular, the ratio of the number of sending email servers 180 probing destination email servers 195 (or the fraction of time that any one or more of the sending email servers 180 spends probing destination email servers 195) to the number of sending email servers 180 delivering email messages to destination email servers 195 found to be available to accept email messages as a result of a successful delivery attempt probe (or the fraction of time that any one or more of the sending email servers 180 spends delivering email messages to destination email servers 195 found to be available to accept email messages as a result of a successful delivery attempt probe) can be varied in an effort to keep the sending email servers 180 that are available to deliver email messages supplied with a steady stream of email messages bound for destination email servers 195 known to be available to accept email.

Furthermore, a traffic optimization module 794 provided at the email server manager 150 in some embodiments may intelligently vary one or more of the foregoing parameters in response to actual email message traffic or in correspondence to anticipated email message traffic patterns, including daily or seasonal patterns in email message traffic and/or patterns in email traffic between particular source email servers 105 and particular destination email servers 195.

As another example of traffic optimization that may be carried out by the traffic optimization module 794 in some embodiments, scheduling of destination email servers to be probed in accordance with temporal queue locking as described above may be carried out so as to maximize actual or expected flow of email messages to destination email servers 195.

In yet another example of traffic optimization that may be carried out by the traffic optimization module 794 in some embodiments, the sending email servers 180 may be made to provide feedback to the email server manager 150 not just following a delivery attempt probe of a destination email server 195 but also after successful delivery of any email message to any destination email server 195 regardless of whether the successful delivery occurred as a result of a delivery attempt probe. As a result, reliability can be improved, since a copy of the email message remains stored in the queue and can be reassigned to the same or another sending email server 180 when a problem at one of the sending email servers 180 results in failure of the sending email server 180 to report successful completion of delivery of the email message. That is, in the same way that a successful delivery attempt probe may be used in some embodiments to signal to the email server manager 150 that a destination email server 195 is available to receive email messages, following which email messages bound for the same destination as the successfully delivered email message may be preferentially taken up for delivery, an unsuccessful delivery attempt probe may be used in some embodiments to signal to the email server manager 150 that a destination email server 195 is no longer available to receive email messages, following which email messages bound for the same destination as the unsuccessfully delivered email message would be placed at or near the bottom of the queue or otherwise given low priority for delivery until such time as a delivery attempt probe again results in successful delivery to that destination. By thus encouraging flow of traffic to destinations known to be available to receive email messages and discouraging flow of traffic to destinations know to be not currently available to receive email messages, it is possible to improve capacity, throughput, and efficiency.

Furthermore, in some embodiments, a load balancing module 792 provided at the email server manager 150 may intelligently assign email message traffic to sending email servers 180 based on known email message volume bound for respective IP addresses and based on known capacity of respective sending email servers 180.

Furthermore, in some embodiments the receiving email servers 120 and/or the sending email servers 180 may be under the control of the load balancing module 792 such that the load balancing module 792 can cause a machine or server to act as receiving email server 120 or as sending email server 180 depending on load. That is, if the sending email servers 180 are operating near their full capacity, the email server manager 150 may cause one or more of the receiving email servers 120 to act as sending email server 180, reducing receiving email server capacity and increasing sending email server capacity in an effort to improve overall capacity, throughput, and efficiency.

As another example, a collision avoiding module 796 provided at the email server manager 150 in some embodiments might carry out processing such that if one or more of the sending email servers 180 are already busy in delivering email messages to a particular destination email server 195, the routing module 783 would not assign additional email messages to the busy sending email servers 180 but might instead assign additional email messages to free or less-busy sending email servers 180.

As yet another example, a crash workaround module 798 provided at the email server manager 150 in some embodiments might carry out processing such that, in the event that that one of the sending email servers 180 crashes or otherwise becomes nonresponsive, the routing module 783 would reassign any email messages that had been assigned to the crashed sending email server 180 to one or more of the other sending email servers 180.

As described above, in an email system in which server function has been scaled out so that, for example, there are multiple machines available for receiving email, storing email, queuing email, and trying to deliver email, the present invention permits coordinated use of such redundant or distributed resources.

Although multiple receiving email servers 120 and multiple sending email servers 180 are shown at FIG. 2, some embodiments of the present invention may employ a single receiving email server 120 and/or a single sending email server 180. Where multiple receiving and/or sending servers are employed, these may be on multiple machines or any subset thereof may be on the same machine.

Although the terms "source" and "destination" have been used, note that there is no particular objection to the possibility that source and destination are the same location; for example, there is no particular objection to the source and the destination having the same IP address. Furthermore, although components inside the dashed line at FIG. 2 have been described as being "local," and components outside the dashed line at FIG. 2 have been described as being "remote," there is no particular objection to the possibility that local and remote locations refer to the same location; for example, there is no particular objection to a situation in which local and remote locations have the same IP address. Moreover, there is no particular objection to the possibility that a server acts as source for some email messages and acts as destination for other email messages.

Although the present invention has been described in terms of an example in which there is an array of one or more receiving email servers 120 and there is an array of one or more sending email servers 180, the present invention is not limited thereto, it being possible in some embodiments that the receiving email servers 120 may be absent, connection to a source email servers 105 being made directly from the email server manager 150 such that incoming email messages are delivered directly from the source email servers 105 to the email message queue 155. Despite use of the word "array" with reference to the receiving email servers 120 and despite the fact that multiple receiving email servers 120 have been shown at FIG. 2, it is therefore possible in some embodiments for there to be only one receiving email server 120 or even for there to be no receiving email server 120. Similarly, although the word "array" has been used with reference to the sending email servers 180 and although multiple sending email servers 180 have been shown at FIG. 2, the present invention is not limited to embodiments in which there are multiple sending email servers 180, as some of the aspects of the present invention may be implemented even where there is only one sending email server 180.

It should also be noted that, in accordance with an alternative embodiment of the invention, functionality of the sending email servers 180 may be located within the email server manager 150, thereby resulting in there not being a need for separate sending email servers 180.

Although two source email servers 105 and two destination email servers 195 are shown at FIG. 2, this is merely for exemplary purposes, it being possible in general for there to be one or more source email servers 105 and it being possible in general for there to be one or more destination email servers 195. In particular, the cloud-like outline used to represent source email servers 105 and destination email servers 195 at FIG. 2 most typically represents the large set of source and destination email servers available over the Internet or a similarly large network, so it is envisioned that there will typically be a large number of source email servers 105 and a large number of destination email servers 195. Furthermore, although each source email server 105 is shown in FIG. 2 as being connected to two receiving email servers 120, and each destination email server 195 is shown in FIG. 2 as being connected to two sending email servers 180, this is merely for exemplary purposes, it being possible in general for each source email server 105 to be connected to any subset (including all) of the receiving email servers 120, and it being possible in general for each destination email server 195 to be connected to any subset (including all) of the sending email servers 180. Moreover, it goes without saying that as the source email servers 105 and the destination email servers 195 shown in cloud-like outline at FIG. 2 represent the large number of source and destination email servers available over the Internet or similarly large network, the receiving email servers 120 and the sending email servers 180 would respectively typically make and break connection to a large number of source email servers 105 and destination email servers 195 (and not just to the two of each which are shown at FIG. 2) during normal operation.

Although the present invention has been described in terms of an example in which there are multiple source email servers 105, this need not be the case, it being possible in some embodiments for email messages to be supplied to the email server manager 150 from only a single source email server 105. In addition, there may be a single destination email server 195.

Although the present invention has been described in terms of an example in which IP addresses are used to identify destinations of email messages stored in the email message queue 155, this is only for exemplary purposes, it being possible to apply the invention to delivery of email messages bound for destinations as indicated by any suitable identifier. For example Domain Names, the DNS system, MX records, A records, and AAAA records may be used to address the destination identifier, or any other suitable destination identifier may be used. Furthermore, although the present invention has been described in terms of an example in which the IP address or other suitable destination identifier is present in an email message header, the present invention is not limited to email messages having headers, it being possible to apply the present invention to delivery of email messages without headers so long as email messages are associated in some fashion with IP addresses or other suitable identifiers indicating respective delivery destinations.

Although the present invention has been described in terms of an example in which there is only a single email message queue 155, there is of course no objection to presence of multiple email message queues 155, in which case operations carried out by the email server manager 150 would be modified accordingly, as will be readily understood by one of skill in that art. In addition, there may be multiple email server managers.

Although the present invention has been described in terms of an example in which the managed email system 100 possesses filtering functionality, scheduling functionality, queue locking functionality, sending email server availability and successful delivery reporting functionality, available destination preferential treatment functionality, load balancing functionality, and so forth, all of the functionalities described need not be present, it being possible in some embodiments for the managed email system to be provided with any subset of the functionalities.

As described above, electronic mail server management systems and methods in accordance with various aspects and embodiments of the present invention solve one or more of the problems mentioned above, and may also provide other advantages and benefits.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A non-transitory computer readable medium comprising instructions which, when executed by one or more hardware processors, cause performance of operations comprising:
   receiving, by an email server management system (ESMS), a first email message to be delivered to a plurality of destination email servers;
   determining, by the ESMS, that (a) email delivery to a first destination email server in the plurality of destination email servers is locked by the ESMS and (b) email delivery to a second destination email server in the plurality of destination email servers is not locked by the ESMS; and
   responsive to determining (a) and (b): attempting, by the ESMS, delivery of the first email message to the second destination email server without attempting delivery of the first email message to the first destination email server.

2. The medium of claim 1, the operations further comprising:
   determining that email delivery to the first destination email server is no longer locked by the ESMS; and
   responsive to determining that email delivery to the first destination email server is no longer locked by the ESMS: attempting delivery of the email message to the first destination email sever.

3. The medium of claim 1, the operations further comprising:
   receiving, by the ESMS, a second email message to be delivered to at least the first destination email server;
   determining, by the ESMS, that the first destination email server is not available; and
   responsive to determining that the first destination email server is not available: locking delivery to the first destination email server.

4. The medium of claim 3, wherein determining that the first destination email sever is not available comprises:
   making an email delivery attempt to the first destination email server; and
   determining that the email delivery attempt has failed.

5. The medium of claim 1, wherein determining that email delivery to the first destination email server is locked comprises determining that a sending email server, configured to deliver email messages from the ESMS to the first destination email server, is busy.

6. The medium of claim 1, wherein determining that email delivery to the first destination email server is locked comprises determining one or more load capacities, respectively, of one or more sending email servers configured to deliver email messages from the ESMS to the first destination email server.

7. The medium of claim 1, the operations further comprising:
   storing, by the email server manager, the first email message in an email delivery queue,
   wherein determining that the first destination email server is locked by the email server manager comprises determining that the email server manager has applied a lock to the email delivery queue.

8. A system comprising:
   one or more hardware processors; and
   one or more one or more non-transitory computer-readable media storing instructions, which when executed by the one or more hardware processors, cause execution of operations comprising:

receiving, by an email server management system (ESMS), a first email message to be delivered to a plurality of destination email servers;

determining, by the ESMS, that (a) email delivery to a first destination email server in the plurality of destination email servers is locked by the ESMS and (b) email delivery to a second destination email server in the plurality of destination email servers is not locked by the ESMS; and responsive to determining (a) and (b): attempting, by the ESMS, delivery of the first email message to the second destination email server without attempting delivery of the first email message to the first destination email server.

9. The system of claim 8, the operations further comprising:

determining that email delivery to the first destination email server is no longer locked by the ESMS; and responsive to determining that email delivery to the first destination email server is no longer locked by the ESMS: attempting delivery of the email message to the first destination email sever.

10. The system of claim 8, the operations further comprising:

receiving, by the ESMS, a second email message to be delivered to at least the first destination email server;

determining, by the ESMS, that the first destination email server is not available; and responsive to determining that the first destination email server is not available: locking delivery to the first destination email server.

11. The system of claim 10, wherein determining that the first destination email sever is not available comprises:

making an email delivery attempt to the first destination email server; and determining that the email delivery attempt has failed.

12. The system of claim 8, wherein determining that email delivery to the first destination email server is locked comprises determining that a sending email server, configured to deliver email messages from the ESMS to the first destination email server, is busy.

13. The system of claim 8, wherein determining that email delivery to the first destination email server is locked comprises determining one or more load capacities, respectively, of one or more sending email servers configured to deliver email messages from the ESMS to the first destination email server.

14. The system of claim 8, the operations further comprising:

storing, by the email server manager, the first email message in an email delivery queue, wherein determining that the first destination email server is locked by the email server manager comprises determining that the email server manager has applied a lock to the email delivery queue.

15. A method comprising:

receiving, by an email server management system (ESMS), a first email message to be delivered to a plurality of destination email servers;

determining, by the ESMS, that (a) email delivery to a first destination email server in the plurality of destination email servers is locked by the ESMS and (b) email delivery to a second destination email server in the plurality of destination email servers is not locked by the ESMS; and responsive to determining (a) and (b): attempting, by the ESMS, delivery of the first email message to the second destination email server without attempting delivery of the first email message to the first destination email server, wherein the method is performed by at least one device comprising a hardware processor.

16. The method of claim 15, the operations further comprising:

determining that email delivery to the first destination email server is no longer locked by the ESMS; and responsive to determining that email delivery to the first destination email server is no longer locked by the ESMS: attempting delivery of the email message to the first destination email sever.

17. The method of claim 15, the operations further comprising:

receiving, by the ESMS, a second email message to be delivered to at least the first destination email server;

determining, by the ESMS, that the first destination email server is not available; and responsive to determining that the first destination email server is not available: locking delivery to the first destination email server.

18. The method of claim 17, wherein determining that the first destination email sever is not available comprises:

making an email delivery attempt to the first destination email server; and determining that the email delivery attempt has failed.

19. The method of claim 15, wherein determining that email delivery to the first destination email server is locked comprises determining that a sending email server, configured to deliver email messages from the ESMS to the first destination email server, is busy.

20. The method of claim 15, wherein determining that email delivery to the first destination email server is locked comprises determining one or more load capacities, respectively, of one or more sending email servers configured to deliver email messages from the ESMS to the first destination email server.

* * * * *